United States Patent [19]
Manghirmalani et al.

[11] Patent Number: 5,819,028
[45] Date of Patent: Oct. 6, 1998

[54] METHOD AND APPARATUS FOR DETERMINING THE HEALTH OF A NETWORK

[75] Inventors: Ravi Manghirmalani, Fremont; Atul R. Garg, Santa Clara; Judy Y. Dere, Campbell; Minh A. Do, San Jose; Leon Y. K. Leong, Monte Sereno, all of Calif.

[73] Assignee: Bay Networks, Inc., Santa Clara, Calif.

[21] Appl. No.: 835,803

[22] Filed: Apr. 16, 1997

Related U.S. Application Data

[63] Continuation of Ser. No. 896,213, Jun. 10, 1992, abandoned.
[51] Int. Cl.$^6$ ..................................................... G06F 11/00
[52] U.S. Cl. ............................ 395/185.1; 395/184.01; 395/183.22; 395/200.54
[58] Field of Search ..................... 395/185.1, 185.01, 395/184.01, 185.09, 183.22, 182.02, 183.16, 200.54, 200.53

[56] References Cited

U.S. PATENT DOCUMENTS

| | | | |
|---|---|---|---|
| 4,434,489 | 2/1984 | Blyth | 371/29.1 |
| 4,847,837 | 7/1989 | Morales et al. | 371/8 |
| 4,881,230 | 11/1989 | Clark et al. | 371/20.1 |
| 5,123,017 | 6/1992 | Simpkins | 395/575 |
| 5,159,685 | 10/1992 | Kung | 395/575 |
| 5,233,688 | 8/1993 | Too | 395/155 |
| 5,291,590 | 3/1994 | Ohnishi et al. | 395/575 |
| 5,293,323 | 3/1994 | Doskocil et al. | 364/551.04 |
| 5,297,248 | 3/1994 | Clark | 395/155 |
| 5,317,568 | 5/1994 | Bixby et al. | 370/85.6 |

OTHER PUBLICATIONS

Chang et al "A Network Status Monitoring System Using Personal Computer" Globecom '89, IEEE pp. 201–206 vol. 1 1989.

Barnett III et al "LANCET: Local Area Network Comprehensive Evaluation Tool" Proceed. of the Computer Networking Symposium, IEEE Comp. Soc. Press. pp.: 340–347, 1988.

Harden et al "A Performance Monitor for the MSPARC Multicomputer" IEEE Southeastcon '92, IEEE pp.: 724–729 vol. 2.

Tjaden et al, "Integrated Network Management For Real–Time Operations", IEEE Network Magazine, Mar. 1991 pp. 10–15.

"Hewlett–Packard Series 386 Network Advisor Brochure, Printed in the U.S.A., Feb. 1991, pp. 1–13".

*Primary Examiner*—Robert W. Beausoliel, Jr.
*Assistant Examiner*—Joseph E. Palys
*Attorney, Agent, or Firm*—Blakely, Sokoloff, Taylor & Zafman LLP

[57] ABSTRACT

An apparatus which provides the user with an indication of the computer network's health. The indication is provided by a network management station on the computer network. The network management station has a distributable piece of code which instructs agents to gather diagnostic and status information. The network management station then evaluates the network specific diagnostic and status data gathered by the agents. Based on the evaluation, the network management station generates a representation of the computer network's functionality (i.e., its "health"). Thereby, the user can readily determine whether the computer network requires repairs.

25 Claims, 12 Drawing Sheets

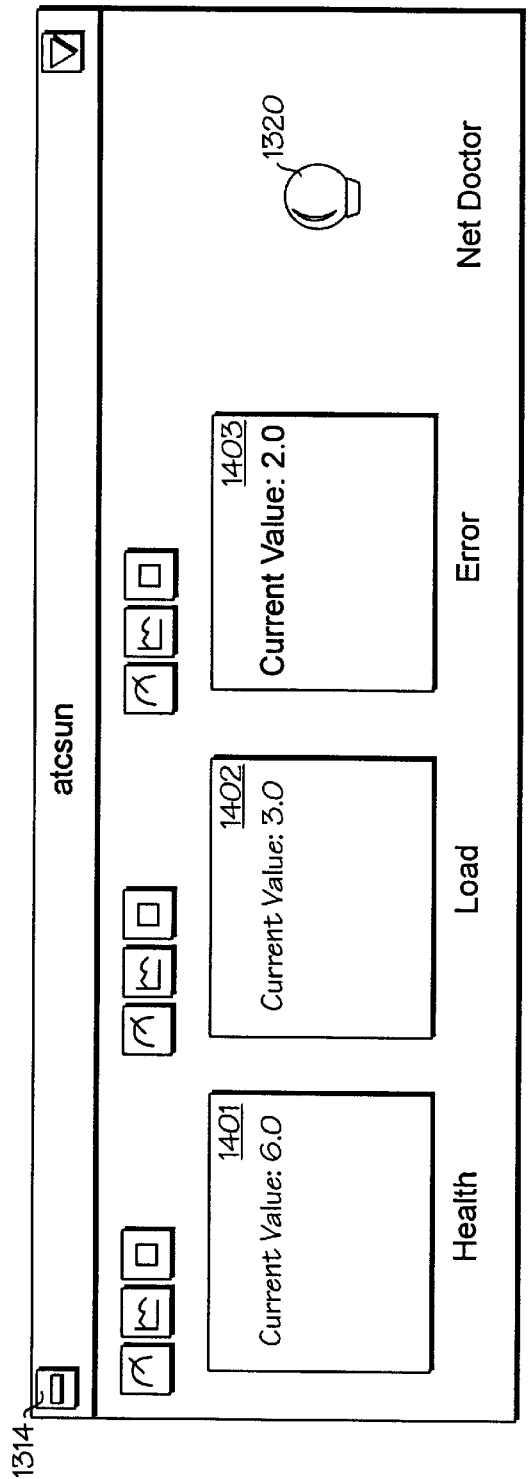
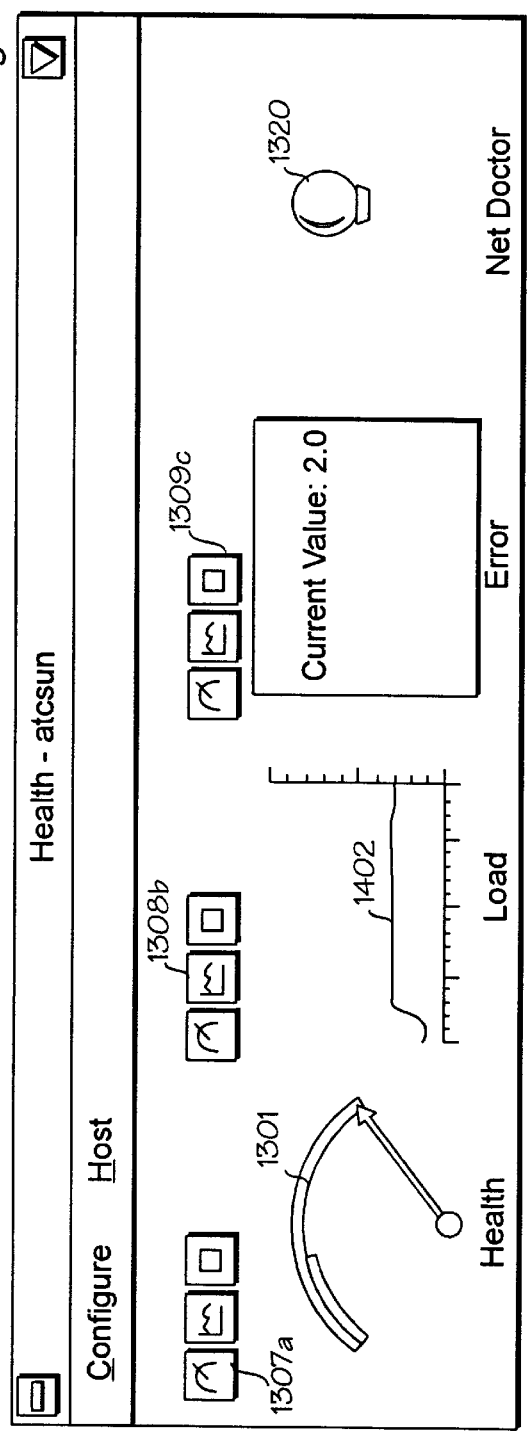
Fig. 15
Fig. 16

METHOD AND APPARATUS FOR DETERMINING THE HEALTH OF A NETWORK

This is a continuation of application No. 07/896,213, filed Jun. 10, 1992, now abandoned.

FIELD OF THE INVENTION

The present invention relates to the field of network entities and domains; more specifically, to the generation and display of certain generic objects of a network entity or domain.

BACKGROUND OF THE INVENTION

In the history of computer systems, highly centralized mainframe computers initially dominated the industry. The mainframes later lead the way to the less expensive and more versatile minicomputers. With the advent of the personal computers, computing power was distributed to end users at the desktop. This paved the way for the powerful and high-speed workstations. Ultimately, these personal computers and workstations were connected together in order to allow the end users to share files, applications, and peripheral hardware (e.g. printers, storage devices such as disk drives, etc.). Thereby, individuals and work groups could share information and expensive computing resources while increasing the reliability of the computer system. This type of arrangement came to be known as Local Area Networks (LANs).

Basically, a LAN is comprised of a number of data terminals or data terminal equipment (DTE) which are coupled to transmission lines (i.e. circuits, channels, or trunks) through transceivers. A DTE is an individual device such as a personal computer, a workstation, a mainframe computer, a dumb or intelligent terminal, etc. A transceiver couples a DTE to a transmission line and performs any necessary signal conversions. The transmission lines conduct bits of data between the interconnected DTEs. Often, a concentrator (i.e. an intelligent hub or a hub) is used to route and manage traffic on the network.

Various network configurations (topologies) evolved. Some of the more popular configurations include the star, ring, tree, and bus topologies. In addition, various protocols for these networks also evolved. The most widely used protocols include the token bus, token ring, and Carrier Sense Multiple Access with Collision Detection (CSMA/CD) which is sometimes referred to as Ethernet.

Because of the numerous advantages offered by LANs, their numbers and sizes increased. Eventually, individual LANs were interconnected to form expansive, enterprise-wide networks. A collection of computer network entities came to be known as a domain. Repeaters were used to copy and forward bits of data from one network to another, simulating one large network from the combination of two or more separate but similar networks. In cases wherein networks had different protocols (e.g. Ethernet vs. Token Bus), bridges were implemented as an interface so that these networks could become interconnected. Bridges are smart, software-intensive devices. Bridges can be programmed to listen to all network traffic, examine each data packet's destination, and selectively forward each data packet while making any necessary changes. For interconnecting two different networks (e.g. Token Bus vs. X.25), a router is used. Routers also have the capability of directing data packets to their final destination by the least costly available path. Other devices and circuits have been implemented so that various LANs having different cabling schemes, access methods, protocols, operating systems, applications and computing devices can all be interconnected to form one vast network system.

Eventually, this technology was used not only to connect computers locally, but also applied to connect computer networks over large geographic areas. Whereas, LANs are typically owned by a single organization and span no more than a few miles, a Metropolitan Area Network (MAN) covers an entire city by using LAN technology. Similarly, Wide Area Networks (WANs) can span entire countries with the use of satellites, radio systems, and fiber optic technology.

As networks expanded and become more complex, spanning wide geographical areas, and accommodating more users, a network management system is often employed to maximize the control, efficiency and performance of the computer network. Typically, a human operator is charged with the operational aspects of the network management system. This is usually accomplished through the use of a dedicated network management station. The operator is assisted by a more knowledgeable consultant. It is the consultant's job to train and familiarize the operator in the operation of the computer network, to help establish the network guidelines and the operational environment, and to isolate and fix any problems. If a problem arises with a network, the operator calls in consultants and experts who isolate and fix the problem.

However, because of the ever-increasing complexity of modern computer networks, a vast amount of various data is reported to the network management system. Hence, one problem arises in that it is extremely difficult for an operator to assimilate and analyze this data. In order to effectively interpret the data, the operator must undergo extensive training. Even then, it is a difficult task to determine whether a problem actually exists with the computer network. Often, a consultant or expert is called to service the computer network, only to discover, after much wasted time, that there was nothing wrong with the computer network. Or worse, the consultant purchases expensive replacement parts or expansions, when in fact, none were actually needed. Another related problem is that if there truly is a problem, it is difficult for the operator to determine its severity.

Yet another problem with computer networks is that as the load on the computer network increases, the error rate also increases. This might lead the operator to erroneously conclude that the computer network is broke when, in fact, the network is completely functional but is just momentarily overloaded. Again, one or more consultants and/or experts are called to expend fruitless time, energy, and money to find and fix a problem which no longer exists after the load on the network peaked and had since subsided.

In the prior art, there are expert systems which analyze data input on a specific system according to a software program and outputs specific conclusions as to what is broken and the corrections needed to repair it. As applied to computer networks, an expert system accepts data concerning the performance of the network, analyzes the data according to pre-programmed parameters, and outputs specific conclusions as to likely problems with the computer network when prompted. However, one disadvantage with expert systems is that it does not evaluate the overall performance or the general "health" of the computer network. In particular, an expert system does not assimilate and interpret data received from the network and display this information to the operator in an easily understandable format so that the operator can determine whether the computer network is actually broken. What is needed is an apparatus for providing the operator with an assimilated, compiled generic objects providing information on various performance parameters of the computer network, which can easily be interpreted by the operator.

SUMMARY AND OBJECTS OF THE INVENTION

In view of the limitations of prior art computer networks, it is one object of the present invention to determine the health of a network entity or domain.

Another object of the present invention is to monitor and interpret the behavior of network entities or domains in a manner that is specific, yet independent of the network entity.

Another object of the present invention is to consolidate data specific to a network entity or domain by implementing a generalized paradigm to be applied to a diverse set of network entities or domains in a common and consistent manner.

Another object of the present invention is to monitor Ethernet, Token Ring, Fiber Distributed Data Interface, and other types of networks along with any bridges, routers and concentrators.

Another object of the present invention is to determine the health of a network by analyzing current data in the context of historical data and network specific data.

Yet another object of the present invention is to provide a simple, high-level consolidation of the bottom-line health of a computer network, which is measured by simple metrics representation and presented to the operator in an easily understandable fashion.

Other objects, features, and advantages of the present invention will be apparent from the accompanying drawings and from the detailed description which follows below.

These and other objects of the invention are provided for by designing an apparatus which provides the user with an indication of the computer network's degree of functionality. The indication is provided by a network management station on the computer network. The network management station has a distributable piece of code which instructs agents to gather diagnostic and status information. The network management station then evaluates the network specific diagnostic and status data gathered by the agents. Based on the evaluation, the network management station generates a representation of the computer network's functionality (i.e., its "health"). Thereby, the user can readily determine whether the computer network requires repairs.

BRIEF DESCRIPTION OF DRAWINGS

The present invention is illustrated by way of example and not limitation in the figures of the accompanying drawings, in which like references indicate similar elements, and in which:

FIG. 15 illustrates a typical meter window wherein digital meters are displayed on a network management system.

FIG. 16 illustrates a typical meter window wherein a health dial meter, load graph meter, and an error digital meter are displayed.

DETAILED DESCRIPTION

An apparatus and method for using generic network management objects for providing information on a computer network is described. In the following description, specific details such as protocols, network configurations, devices, etc. are set forth in order to provide a thorough understanding of the present invention. However, it would be obvious to one skilled in the art that the present invention can be readily applied to a variety of different protocols, configurations, devices, and networks.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Figure 1:
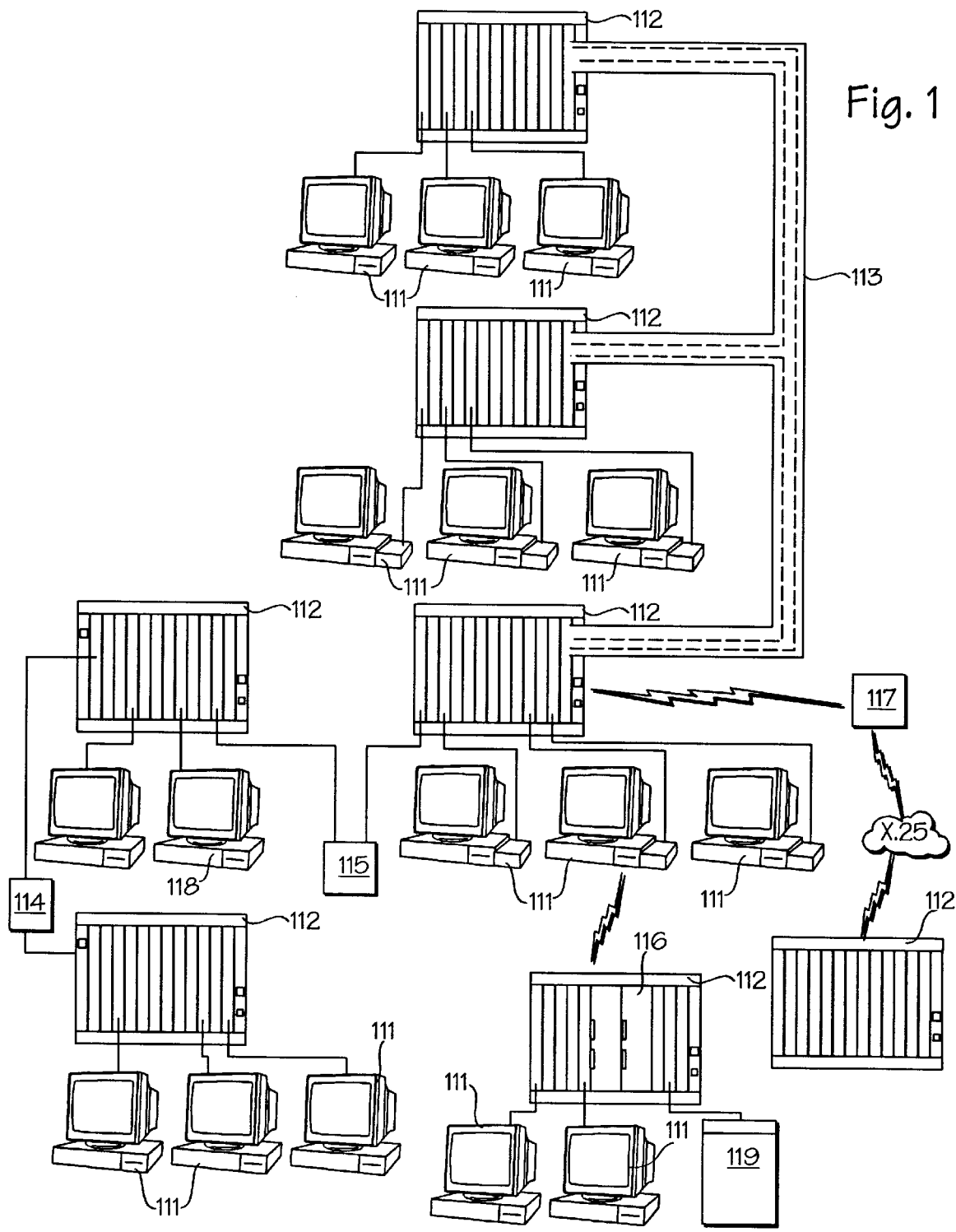
FIG. 1 illustrates a typical computer network.

FIG. 1 is a diagram of a computer network system embodying the present invention. A number of users access the network via data terminal equipment (DTE) 111 which can be a personal computer, a workstation, a dumb terminal, etc. The DTE 111 are coupled to concentrators 112 by means of cables. These cables can include unshielded twisted pair wires and shielded twisted pair wires (coaxial and fiber optic cables exist for Ethernet). Concentrators 112 act as focal points for managing and routing network data transmissions. A number of concentrators can be intercoupled by means of a fiber optic cable 113. When two network segments are coupled by a long cable run, the signals become attenuated. Hence, a repeater 114 is used to amplify the signals.

A bridge 115 can be used to couple two concentrators which service network segments having differing protocols (e.g. an Ethernet-to-Token Ring bridge). Bridge 115 listens to data transmissions, examines each data packet's destination, makes any necessary conversions, and discriminately forwards each data packet. A remote bridge 116 allows the coupling of geographically dispersed network segments through a variety of serial links. A router 117 is used to interface and couple two networks having differing network layers (e.g.

Token Bus vs. X.25). A router also has the capability of directing data packets to their final destination by the least costly available path. By adding a file server 19 to the network, users are able to share stored files and applications.

The computer network of FIG. 1 can be greatly expanded to accommodate several hundred users by adding more DTEs 111, concentrators 112, repeaters 114, bridges 115, and routers 117. These devices may be added on an as needed basis. Various parts of the network can be configured any number of ways to suit the needs of the users (e.g., star, ring, tree, etc.).

Furthermore, various parts of the network can employ different protocols such as Ethernet, token ring, token bus, etc. It should be noted that the present invention can be applied to virtually any type of computer network configuration.

In the currently preferred embodiment, the present invention utilizes a network management system to manage comprehensive computer networks Frequently, these computer networks have differing topologies, cabling schemes, access methods, protocols, operating systems, applications, computing devices, etc. and are subject to constant upgrades and adaptations. Hence, it is the function of the network management system to collect, monitor, control, and display various aspects associated with the computer network. The network management system accomplishes its task by gathering data close to the source; reducing the data to meaningful information; and presenting the resulting data to one or more central management stations which then displays the data to an operator. A central management station 118 is shown in FIG. 1. An example of a network management system is the LattisNet™ Network Management System by SynOptics™ (LattisNet and SynOptics are trademarks of SynOptics Communications, Inc.).

The network management station initiates the data gathering process by sending queries to agents located within each concentrator. An agent is a pre-configured software program that continually collects data as specified by the program. The collected data is stored in a local register. Network Management Software periodically requests these agents to send the contents of their local registers. The agents send the requested data to the network management station. After processing, the data is graphically displayed to a human operator. It is the human operator's job to interface with the operational aspects of a network management environment.

Figure 2:
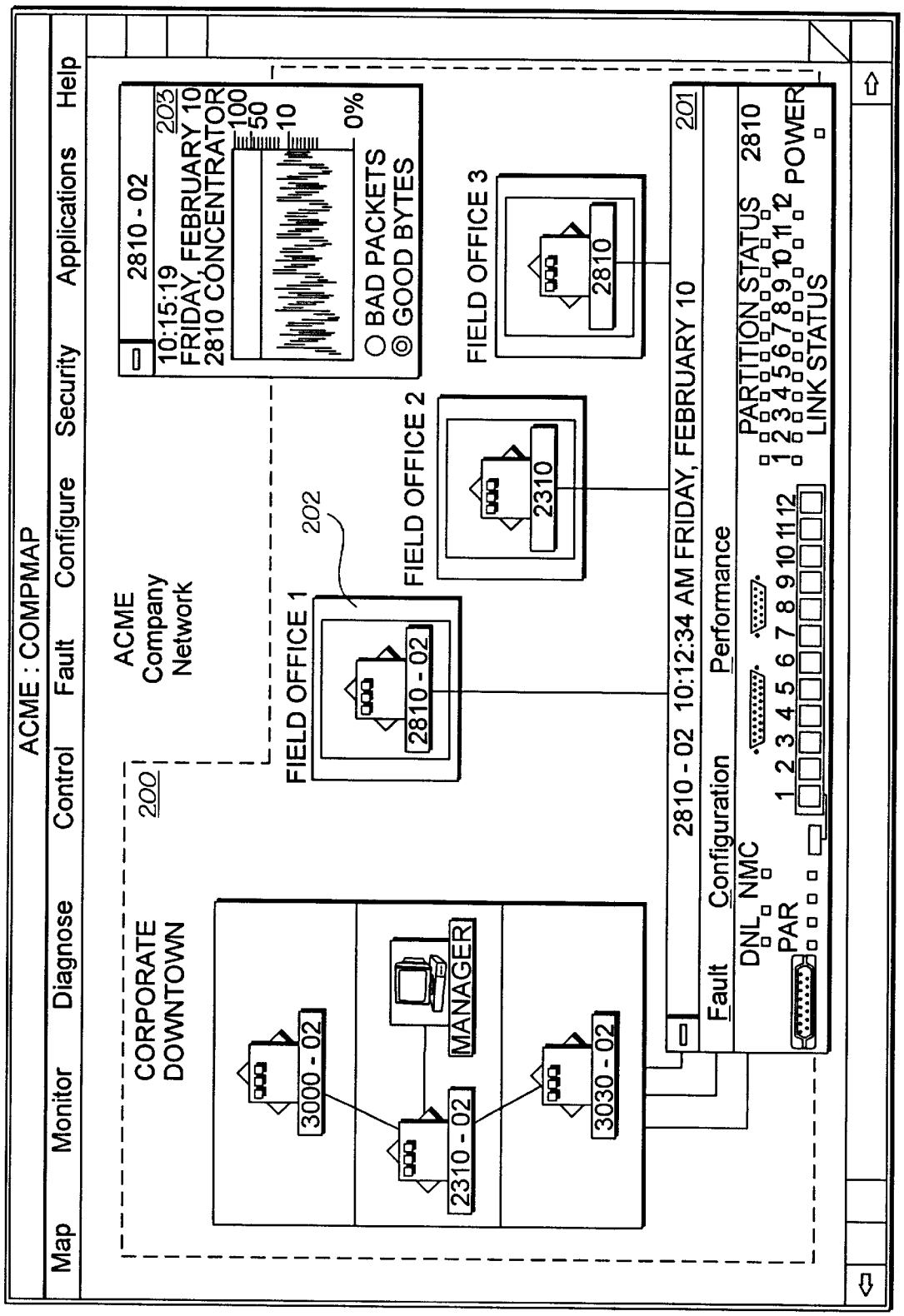
FIG. 2 illustrates a typical network management display.

By using a network management system, the operator can obtain and evaluate system-wide diagnostic and status information, monitor network devices and their locations, observe network activity, and control access to the network system. FIG. 2 is an example of a network management display. A geographical map 200 of the computer network is displayed. In addition, the operator can perform port-level monitoring and control throughout the network. For example, window 201 can be accessed to monitor and control the port of concentrator 202. In addition, the status of an individual device on the network, can be displayed. For example, window 203 shows the number of good bytes received by concentrator 202.

In order to facilitate the operator's job, the present invention utilizes a distributable piece of code which is capable of running in either UNIX or DOS operating environments. The code is distributable in that it is not required to reside entirely in one device. Portions of the code can be placed in various locations in the network. For instance, in a large network, pieces of the code can be distributed amongst a number of different network management stations in order to monitor various parts of the network. Each of these network management stations can pass their information to a central network management station. In this manner, polling is localized, thereby decreasing the overall network traffic.

This piece of code reduces the data gathered by the agents into a set of common or generic objects. These common or generic objects are then displayed to the operator in an easy-to-understand format. In the currently preferred embodiment, generic objects include the health, load, error, and performance of the network. In addition, these objects can also be provided to the operator for individual devices on the network.

Health

The "health" of a network is an overall numerical representation of how well the network is functioning. The health of the network is computed based on inputted network specific data. The inputted network specific data includes: the status of the devices and servers on the network, the average network utilization, the collision rate, and the error rate. However, it would be obvious to one skilled in the art that other types of network specific data can also be factored in the calculation of the health score. For example, for token rings, errors can be broken into isolating or non-isolating errors, where isolating errors are used to determine the source of the error. For Ethernet bridges, forwarding and filtering values for the ports can also be factored in calculating health.

Applying the inputted data to a set of pre-defined formulas results in a health "score". The health score and falls within a given range. The high end of the range signifies that the network is in excellent or good health (i.e., the network is functioning properly). The low end of the range signifies that the network is in critical or poor health (i.e., the network is not functioning properly). For example, given a health score range from 0 to 10, a perfect health score is a "10", meaning that the network is functioning at peak performance. As problems with the network arise, the health score will decrease in proportion to the increase in the severity of the problems. If the health score falls to or below a certain health score (e.g., "3", an alarm condition is reached. The alarm condition signifies that serious problems exist with the network or device. If the health score drops below 0, it is deemed to be 0, since the network has serious problems which need to be addressed. Thus, network specific information can be consolidated by a generalized paradigm which can be applied to a diverse set of networks in a common and consistent manner. The behavior of networks or domains can be monitored and interpreted in a manner which is specific, yet independent of the network.

An example is now offered to describe the currently preferred embodiment of how a health score is calculated. For every device on the network which is "down", the health score is subtracted by one point. A device on the network classified as being "down" when it can no longer receive nor send any data. This can be determined by interpreting information from SNMP requests to an agent located where the device is attached. The following algorithm can be used to determine whether a device is down.

IF Device Type=NonTCP THEN
  IF s3EnetPortPartStatus is ENABLED (port for device, e.g. PC)
    AND s3EnetPortJabberStatus is OK
    AND s3 EnetPortLinkStatus is DOWN THEN

```
    DeviceStatus=DOWN ELSE
    DeviceStatus=UNKNOWN
IF DeviceType=Server THEN
  IF ICMP Ping=OK THEN
    DeviceStatus=UP ELSE
    DeviceStatus=DOWN
  IF Device Type=SNMP THEN
  IF get_inaddress=OK THEN
    DeviceStatus=UP ELSE
    DeviceStatus=DOWN
```

For every 5% average utilization exceeding 30 percent, the health score is reduced by one point. The utilization is defined as the number of bytes per second divided by the network frequency. The utilization can be calculated according to the following equation:

Util=Good Bytes/sec divided by 1.25 Meg.

Util={s3EnetConcRxOk($t1$)−s3EnetConcRxOk($t0$)}/($t$−1$t0$)*1.25 M t1−t0 is 60 seconds for computation of average utilization and 5 seconds for peak utilization.

Loss of any file servers reduces the health score by four points.

If the collision rate is between 1–2 percent the health score is decreased by two points. If the collision rate is greater than 2 percent, the health score is decreased by four points. The collision rate is defined as being the number of collisions divided by the number of good packets, over a constant time period. The collision rate can be calculated according to the following equation:

$$\begin{aligned}\text{Coll Rate} &= \text{\# collisions/\# Good Packets over some time period} \\ &= \{\text{s3EnetConcColls (t1)} - \text{s3EnetConcColls (t0)}\}/ \\ & \quad \{\text{s3EnetConcFrmsRxOk (t1)} - \\ & \quad \text{s3EnetConcFrmsRxOx (t0)}\}\end{aligned}$$

In one embodiment, the time period is 60 seconds. For more real-time output, the time period can be re-computed on a shorter time scale (e.g. every 5 seconds).

The health score is decreased by four points if the error rate exceeds 0.2 percent. The error rate can be calculated according to the following equation:

$$\begin{aligned}\text{Error Rate} &= \{\text{\#CRC + Mis Align + Late Coll}\}/\text{\#Good Packets over some time period} \\ &= \{\text{s3EnetConcFCSErrors + s3EnetConcAlignErrors +} \\ & \quad \text{s3EnetConcLateCollErrors}\}/\text{s3EnetConcFrmsRxOk}\end{aligned}$$

In one embodiment, the time period is 60 seconds. However, as with the collision rate, the error rate can be re-computed over a shorter time scale (e.g. 5 seconds) for a more real-time output.

In the currently preferred embodiment of the present invention, in addition to providing the health of the overall system, the health of an individual device on the network can also be provided. Furthermore, the weights assigned to each type of network specific data can be varied, depending on the end user's preferences. In other words, the impacts of the utilization, collision rate, and error rate on the overall health score can be varied by the end-user. In addition, the end-user can choose the formulas to be applied in calculating the health score. If the end-user chooses not to input any specific formulas, the present invention provides a list of default formulas.

In the example given above wherein the health score range between 0 and 10, an alarm condition occurs when the health score drops to 3 or below. The alarm condition is reached under any of the following conditions: the utilization reaches or exceeds 55%, three devices and the server are down, the server is down and the utilization reaches 45%, collision rate is greater than 2% and error rate is above 0.2%, etc.

In an alternative embodiment, inputs from the auto baseline can be used in calculating the health. For example, if the current data significantly differs from the baseline calculated by the auto baselining algorithm, additional points can be detected from the health score. Furthermore, the status of any bridges, routers, and servers can also be factored into the health calculations.

Figure 3:
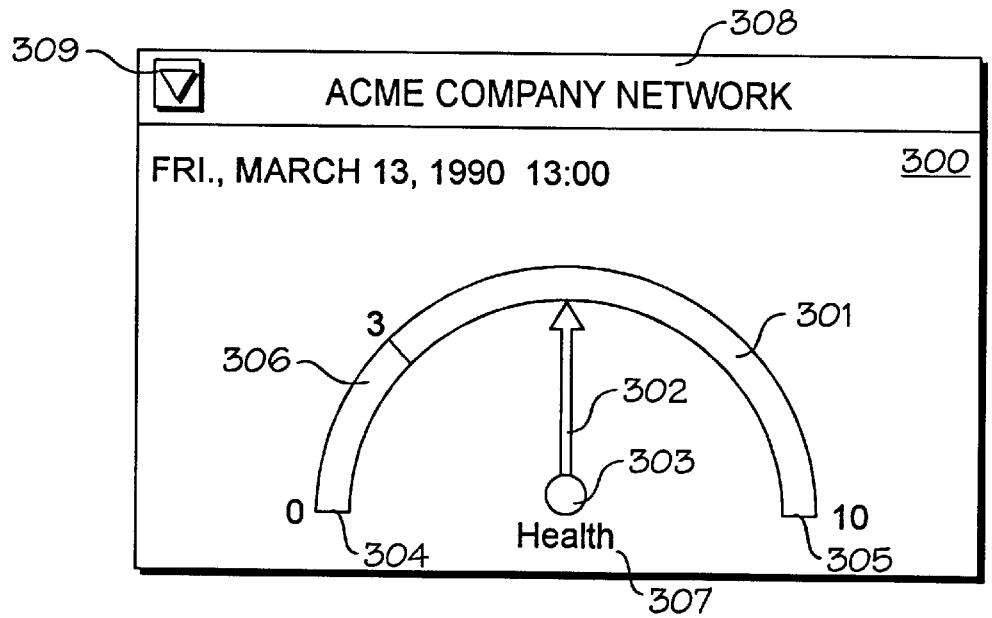
FIG. 3 illustrates a health dial meter.

The health is displayed on a cathode ray tube (CRT) computer monitor on the network management station. The health information can be portrayed in the forms of a dial meter, graph meter, or digital meter. The dial meter is similar to that of an analog speedometer or fuel gauge in a car. A health dial meter is shown in FIG. 3. It is comprised of a crescent-shaped range bar 301 which represents the range of the health score. The health meter also comprises an indicator 302. Indicator 302 pivots about axle 303. Indicator 32 is capable of swinging left and right between the two endpoints 304 and 305 of range bar 301. Endpoint 305 of the health range represents a health score of 10, signifying that the network is in excellent health (i.e., operating at peak performance). Endpoint 305 of the health range represents a health score of 10, signifying that the network is in critical poor health (i.e., requires repair and/or upgrade). The health decreases linearly along range bar 301 going from endpoints 305 to endpoint 304. The location of indicator 302 between endpoints 304 and 305 signifies the present health of the network. The lower portion 306 of the health range is marked off in red to denote that the network or device is in an alarm condition (i.e. poor health). If the health remains in an alarm condition over a period of time, the operator should consider calling a consultant or expert if the health remains poor.

Thus, if indicator 302 is positioned at endpoint 305, this corresponds to a health score of 10, which means that the network is in excellent health (i.e. no devices or servers are down, utilization is low, error rate is low, etc.). If indicator 302 is in the middle of the health range (i.e. vertical), this corresponds to a health score of 5. A health score of 5 indicates one of the following conditions: server and one device are down, utilization of 55%, one device is down and the collision rate exceeds 2%, error rate exceeding 0.2% and an average utilization of 35%, etc. If indicator 302 is in the red zone 306 which extends from a health score of 0 to a health score of 3, this signifies an alarm condition. Health dial meter 300 also displays the current date and time 306, meter name 307, the network/device being monitored 308, and an open/close icon 309 for opening and closing the health window.

Figure 4:
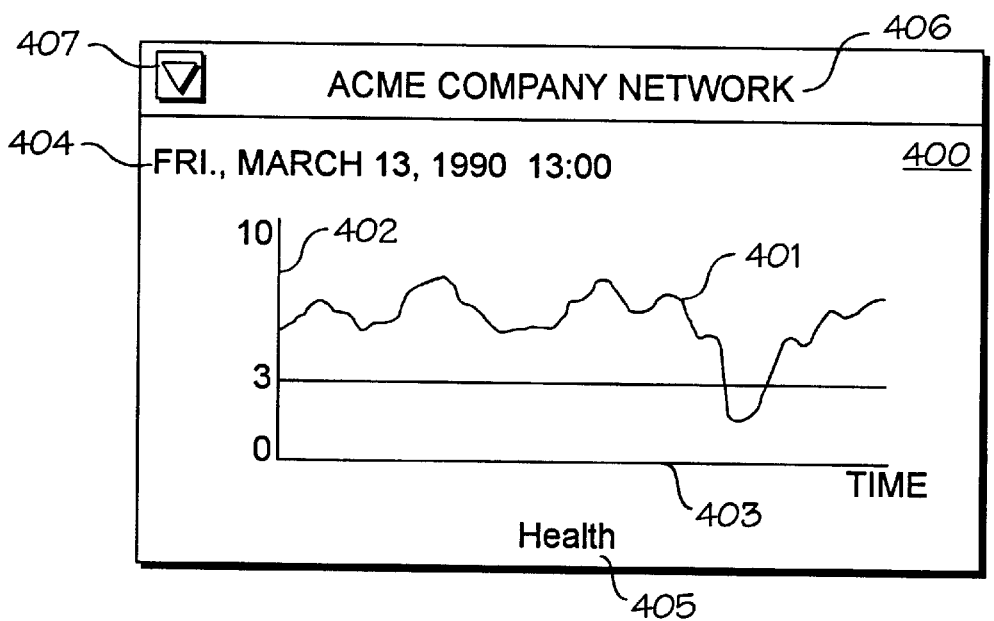
FIG. 4 illustrates a health graph meter.

The health of the network/device can also be displayed in the form of a graph meter 400, as shown in FIG. 4. The health 401 of the network/device is displayed continuously as a function of time. The x-axis 402 represents a range of health scores. The y-axis 403 represents historical time. Similarly, the current date an time 404, meter name 405, the network/device being monitored 406, and icon 407 ar displayed.

Figure 5:
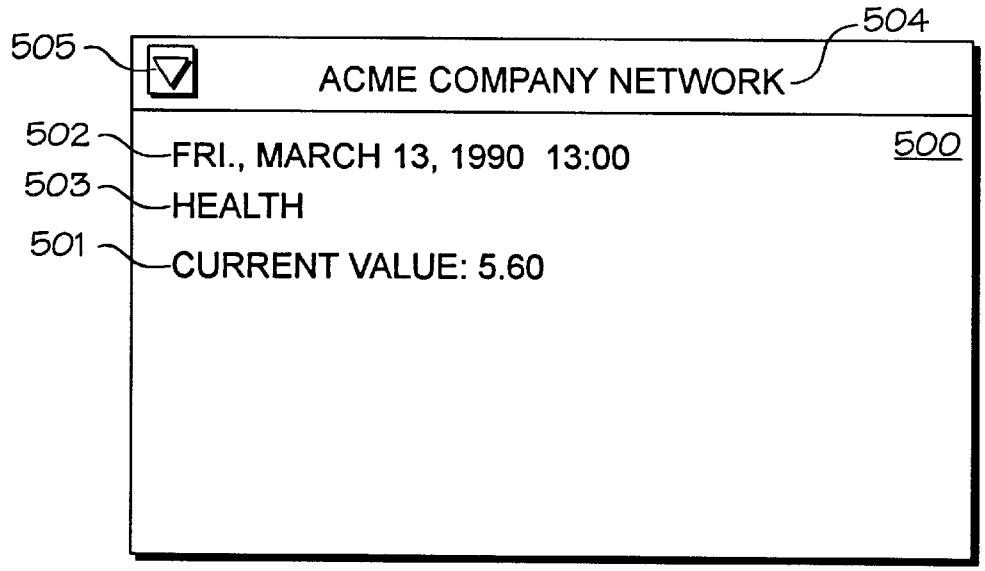
FIG. 5 illustrates a health digital meter.

The health of the network/device can also be displayed in the form of a digital meter 500, as shown in FIG. 5. The current health score 501 is displayed as a number. The current data and time 502, meter name 503, the network/device being monitored 504, and icon 505 are, likewise, displayed.

Thus, object specific data such as the status of devices and servers, the average utilization, collision rate, error rate, etc. is reduced to a generic object, "health" and displayed to the operator in an easy-to-understand dial meter.

Load

Even though the network device is functioning properly, the health of the network device might, nevertheless, be low if there is an excessive amount of traffic on the network device. This is due to the fact that devices and modules such as bridges, routers, servers, etc. are limited to a certain bandwidth. If the load exceeds this bandwidth, the error rate will increase. Since the error rate is typically one factor in determining the health of the network device, an increase in the error rate will detrimentally impact the network's health. One situation which can arise is that the health of a network might be low, even though the network is functioning as designed. This situation occurs when the network is overloaded with more traffic then it can handle.

The present invention addresses this problem by generating a generic object, called the "load" for the network/device. Similar to what was done for determining the "health" of the network, certain network specific data such as the total number of octets received, time interval, total frames received, average frame size, multicast frames received, broadcast frames received, etc., are converted according to a formula to a range (e.g., 0 to 10) which denotes the "load".

Figure 6:
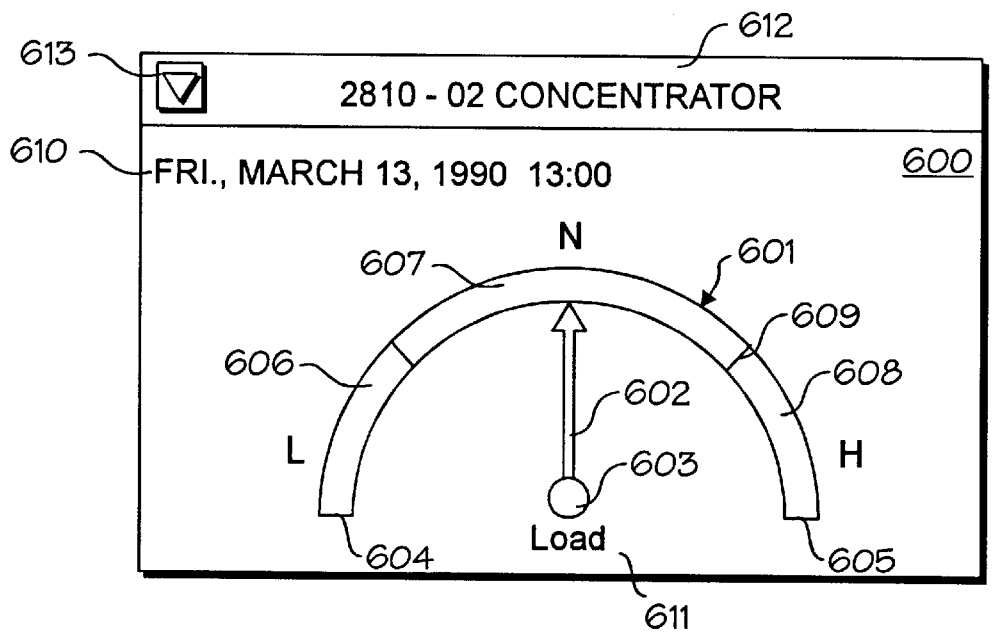
FIG. 6 illustrates a load dial meter.

Similar to the health, the load is displayed on a CRT computer monitor display on the network management station in the forms of either a dial meter, graphical meter, or digital meter. FIG. 6 shows the load in a dial meter 600 for a concentrator. A crescent-shaped load bar 601 represents the range of the load. An indicator 602 pivots about point 603 and swings between endpoints 604 and 605. The left endpoint 604 corresponds to no load on the network/device being monitored. The right endpoint 605 corresponds to an extremely heavy load. The load increases linearly from left to right between the two endpoints 604 and 605. A portion 606 is shaded in red, which signifies that the network/device is being overloaded. The location of indicator 602 between endpoints 604 and 605 determines the load at that time. In one embodiment, the letters L, N, and H represent "low", "normal", and "heavy", loads. Load bar 601 is broken into three sections 606–608, which respectively correspond to low, normal, and high loads. Note that the top end 609 of the normal range 607 is less than the maximum scale 605. The load dial meter 600 also displays the current data and time 610, meter name 611, the network/device being monitored 612, and an open/close icon 613.

The load can also be displayed in a graph meter or digital meter similar to the health graph an digital meters shown in FIGS. 4 and 5, except that the load rather than the health of the network/device being monitored is displayed. Thus, specific network data are reduced to a general object, "load", and displayed to the operator in easy-to-understand meters.

Error

Another generic object for relating information to the operator is the network "error". Certain network specific data such as alignment, frame check sequence (FCS), runt, line, burst, internal, etc. errors are converted according to a formula to a generic object, "error,", range which denotes the error of the network/device. Some default formulas for the "error" is described in the default list given above. The "error" is displayed on the CRT computer monitor of the network management station. Likewise, the error of the network/device being monitored can be displayed in either a dial meter, graph meter, or digital meter. Thus, specific network data are reduced to a general object, "error", and displayed to the operator in an easy-to-understand meters.

Performance

Figure 7:
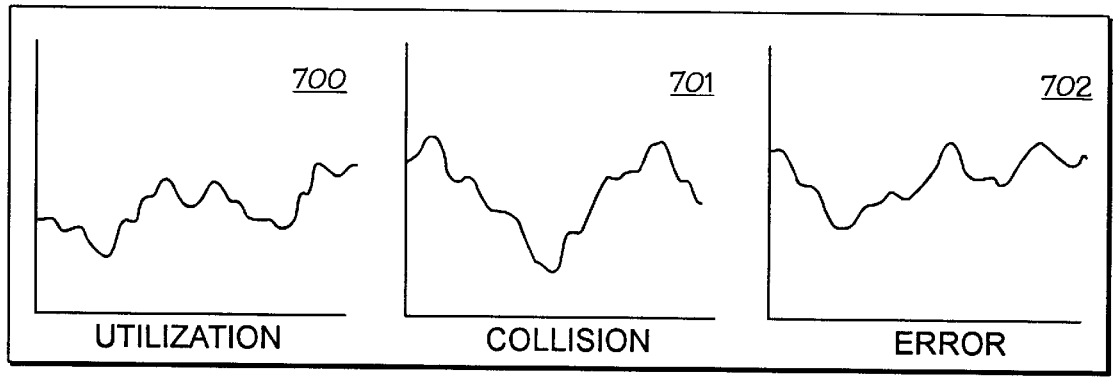
FIG. 7 illustrates meters displaying the utilization, collision, and error rates for a particular computer network.
Figure 8:
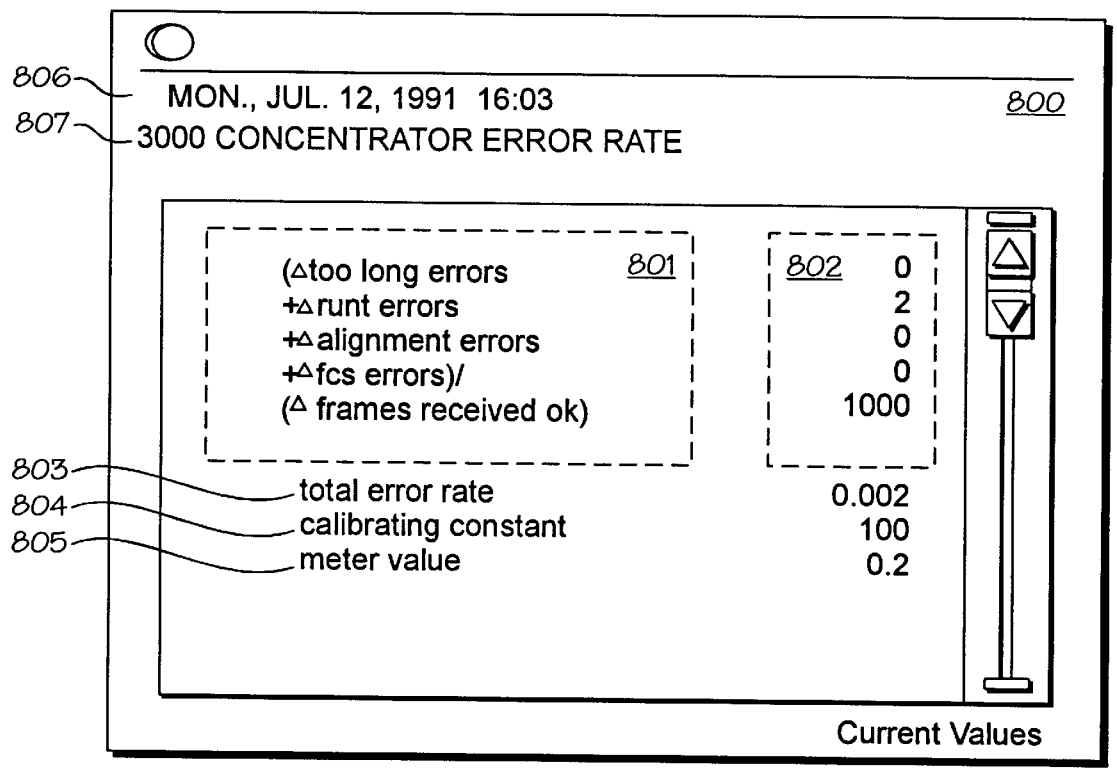
FIG. 8 illustrates a window displaying a formula which is used for calculating the error rate of a computer network.

In the currently preferred embodiment of the present invention, the operator can pull up displays showing various values associated with a particular object. These values can be displayed as either a dial meter, graph meter or digital meter, thereby providing the performance of the network/device to the operator. For example, the utilization, collision, and error rates used in calculating the health of the network/device can be displayed. This is accomplished by the concentrator which collects the values. Concurrently, the concentrator stores the time intervals for each of the values such that the history of the objects and their associated values are readily accessible. FIG. 7 shows an example of meters 700–702 for the utilization, collision, and error rates, respectively. The X axes represent historical clock time, and the Y axes represent the magnitude of the corresponding values. Hence, if the operator notes that the health is decreasing, the operator can check the performance graphs which show delegated functions in more detailed information as to the cause of the health reduction. The present invention also provides for an even more detailed display showing how a particular value was derived. FIG. 8 shows a window 800 which displays the formula used 801 for calculating the error rate. Window 800 includes the current component values 802 comprising the formula. The total raw value 803 (e.g., error rate 0.002) is also displayed, along with a calibrating constant 804 used to calibrate the raw value into a meter value 805. Window 800 also includes the current time 806 and the name 807 of the network/device being monitored.

Use of Historical Data

In the currently preferred embodiment, historical data concerning the network being monitored is factored in calculating the generic objects (e.g., health, load, error, etc.) for that network. It should be noted that, as described above, historical data is not absolutely required in order to calculate the values for the generic objects. However, factoring in historical data yields more accurate and dynamic values for the generic objects. Each network has a unique set of characteristics. It would be difficult to accurately anticipate the characteristics for an arbitrary network based on theoretical knowledge on network behavior. Consequently, the currently preferred embodiment of the present invention collects and correlates various attributes specific to the network being monitored. The specific attributes are collected and processed in real-time. Thereby, the expected behavior of these various attributes can be dynamically computed. Furthermore, the relationship between these attributes can be determined for that specific network.

The result is that any deviations from normal network behavior can be more quickly identified and corrected. These deviations are then fed back into that object's algorithm in estimating future values for that particular object.

Figure 9:
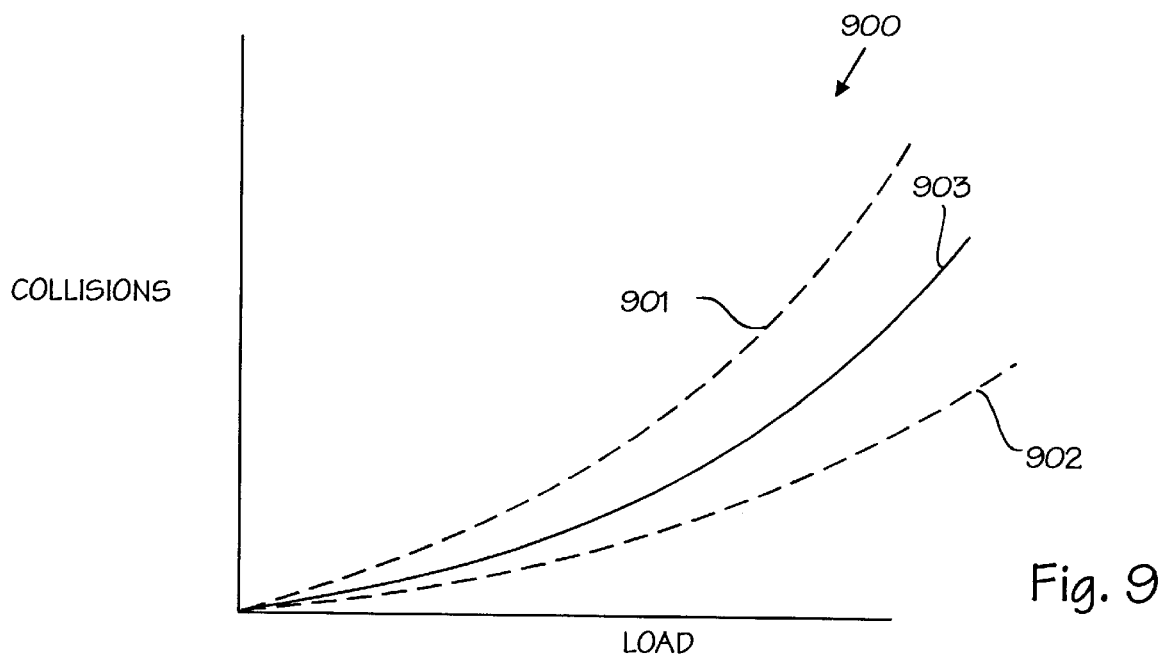
FIG. 9 is a chart illustrating the number of collisions as a function of load for a particular computer network.

For example, on an Ethernet network, the number of collisions for a range of differing loads is measured over time during the operation of the actual network. For the same load level, the number of collisions measured for the actual network will vary to some degree. However, over a period of time, an upper and a lower boundary for the number of collisions for a specific load can be determined. Generally, as the load on the network increases, the number of collisions measured will also increase. FIG. 9 is a chart 900 illustrating the number of collisions as a function of load. The x-axis represents the actually measured load on a particular network while it is in operation, and the y-axis represents the measured collisions for a specific load.

Dashed curve 901 is an upper boundary which signifies the maximum number of measured collisions for given loads. Dashed curve 902 is a lower boundary which signifies the minimum number of measured collisions for a range of differing loads. Solid curve 903 represents the average number of collisions for a range of differing loads. In calculating the maximum 901 and minimum 902 curves, any measured stray points, due to unique errors or even as part of normal behavior, are filtered out.

After the initial calibration for generating the maximum 901, average 903, and minimum 902 values, potential deviations from previously observed "assumed normal behavior" can be identified. For example, the installation of a new device on the network at a distance that exceeds the allowed Ethernet distance limits, will cause the currently measured number of collisions to be approximately four to six times the previous maximum number of collisions.

Based on this information, an object's algorithm can adjust its value accordingly. For example, the health algorithm can interpret the increased number of collisions to be excessive and accordingly reduce the health of the overall network (e.g., minus one on a scale of 1–10). Note that the specific curves (e.g., curves 901–903) could be substantially different for different networks. In the currently preferred embodiment, the generic object's algorithm continuously collects and correlates the measured number of collisions, in order to update the values 901–903. This continuous calibration allows an object's algorithm to adapt to changing network environments. Hence, if the condition described above (i.e., incorrectly installed device) persists over a long period of time, the increased number of collisions is exponentially averaged with the past history. In turn, this causes the maximum collision curve 901 to slowly adjust to new situations and assumes that if the abnormal behavior was identified (e.g., decrease in health), the operator would resolve the problem. Conversely, if the network continues to operate at the new, higher levels, the object's algorithm assumes that the problem has been noted. Any other deviations are determined based on the new parameters. This adaptive learning approach results in more meaningful values for the generic objects and makes the objects applicable to a wide variety of different physical networks.

In addition to the number of collisions, other network specific data such as FCS, late collisions, other network specific data such as FCS, late collisions, etc. are factored into the historical calculations using a similar approach as discussed above. Furthermore, other variables that affect the operation of the network such as the number of devices on the network, the topology used, etc. are also factored into the historical calculations. These different factors are determined empirically. Theoretical knowledge of the network is used to identify the variables, their relationships to other variables, and the determination of normal versus abnormal conditions.

Figure 10:
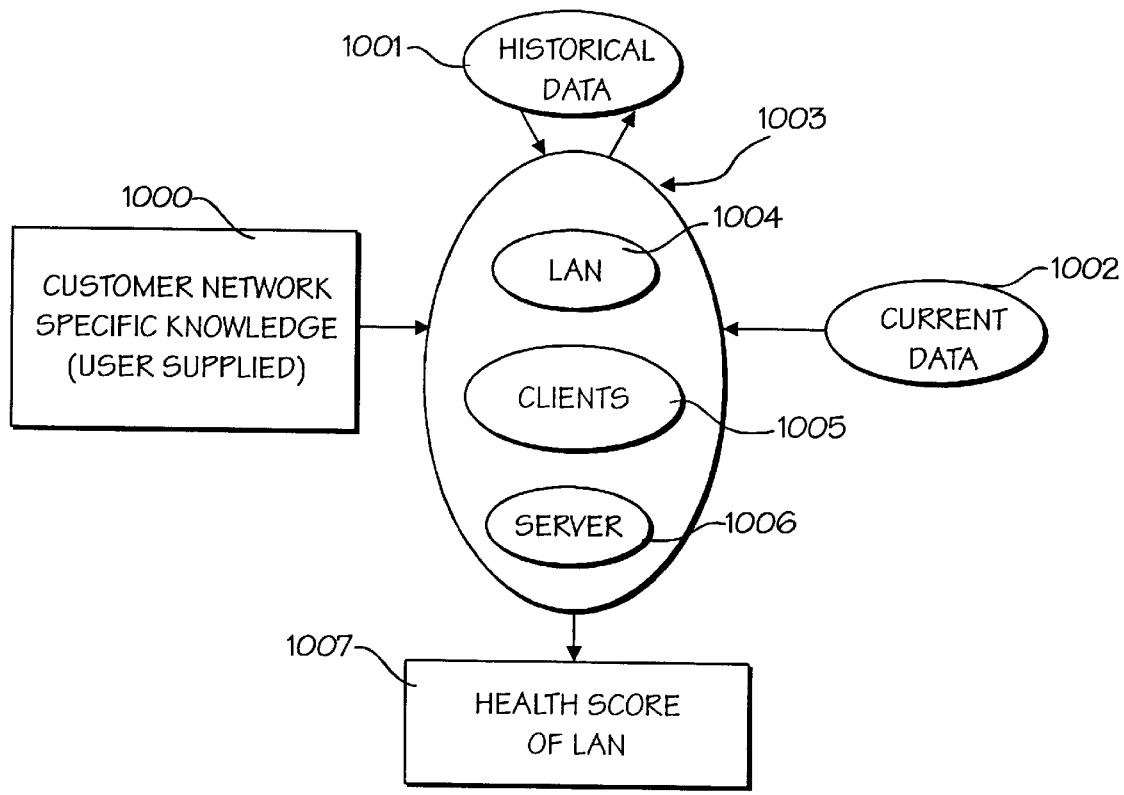
FIG. 10 is a diagram illustrating the process for generating the health of a Local Area Network.

FIG. 10 illustrates the process for generating the health of a LAN. Customer network specific knowledge 1000 supplied by the end-user, historical data 1001 and current data 1002 are inputted into the health algorithm 1003. The current data 1002 is fed back into the historical data 901, to be used in future health algorithm 1003 calculations. Based on various parameters concerning the LAN 1004, the clients 1005, and any servers 1006 on the network, the health algorithm 1003 generates and outputs a health score 1007 for the LAN. The health score 1007 is displayed by a health meter on the network management station.

User Interface

The operator or end-user interfaces with the present invention via windows displayed on a network management station's CRT monitor.

Figure 11:
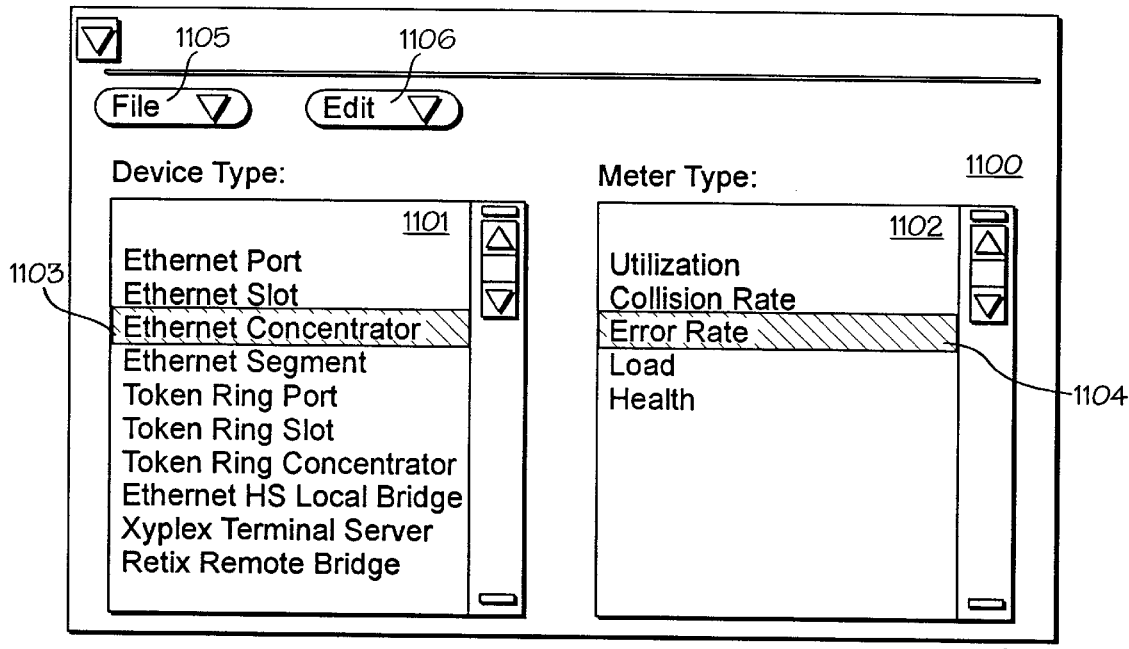
FIG. 11 is a window illustrating a device type scroll box which contains a list of network devices and a meter type scroll box for displaying the meter types which have been defined for the selected device type.

FIG. 11 illustrates a window 1100 which contains two scroll boxes 1101 an 1102. The device type scroll box 1101 contains a list of network devices. The meter type scroll box 1102 displays the meter types which have been defined for the selected device type. The user can select a particular device and meter type. The selected device 1103 and meter 1104 type will be highlighted. A file menu 1105 maintains a configuration file for each specific meter type. The configuration file contains information about the meter formula, MIB objects that are used in the formula, and settings for determining when the dial meter enters the green, yellow, or red areas. A print command allows the configuration file for the selected device and meter type to be printed. The edit menu 1106 allows the user to modify the current configuration of the selected meter type.

Figure 12:
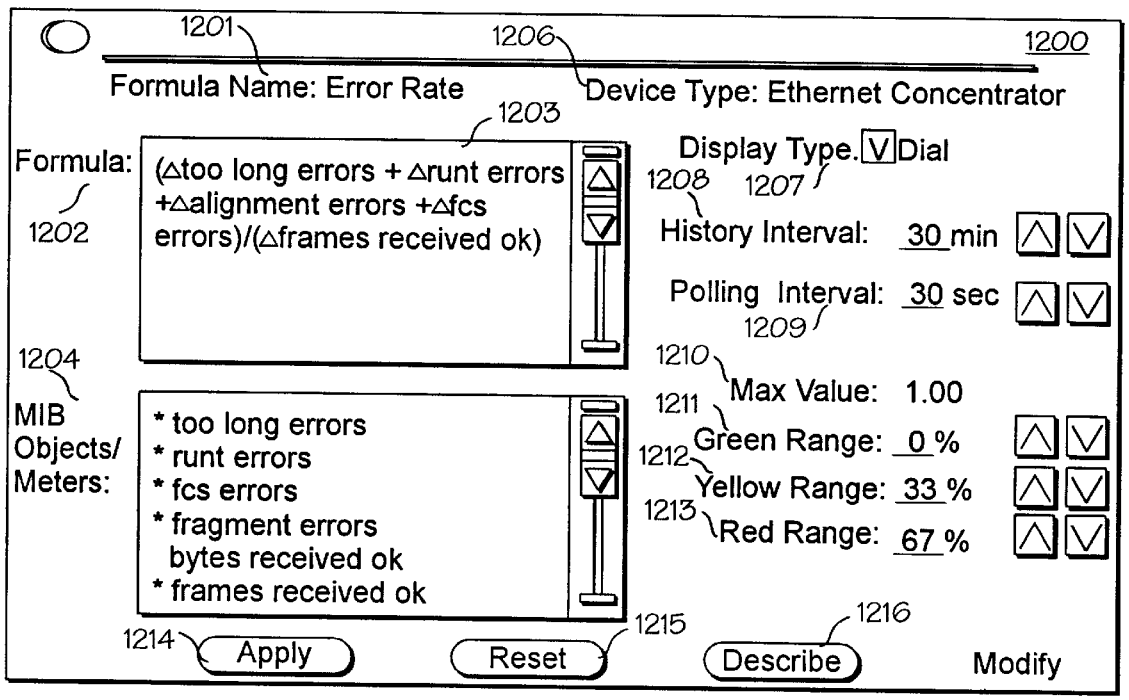
FIG. 12 is a window illustrating the modification of the settings for a particular meter type.

FIG. 12 illustrates a window used to modify the settings for a particular meter type. Formula name 1201 displays the selected meter type. Formula 1202 is comprised of a scroll box 1203 which contains the formula to be applied to the selected meter type 1201. MIB objects/meters 1204 is comprised of a scroll box 1205 which contains a list of MIB objects or meter types which are used in the meter formula 1202. An "*" indicates that the MIB object/meter type is currently being used in the formula. Removal of an MIB object/meter type is accomplished by pointing an clicking a cursor on the desired MIB object/meter in scroll box 1205. Device Type Field 1206 contains the network device type associated with the selected meter type. Display type 1207 indicates the style of the meter (dial, graph, or digital). History interval 1208 specifies the frequency that the current values are to be stored for historical data. Polling interval 1209 specifies the frequency that the meter values are updated and the display is refreshed. Max value 1210 is the theoretical maximum value of the meter. Green range 1211, yellow range 1212, and red range 1213 are fields which specify the range of meter values defining when the meter valves are in the green, yellow, and red areas respectively. The value of these fields are expressed as a percentage of the maximum meter value. The settings for a meter type can be modified by making the necessary edits in the modify window 1200. Clicking the Apply button 1214 will save the changes to the configuration file. Clicking the Dismiss button 1215 will cause the changes to be ignored.

Selecting Describe button 1216 provides a "notepad" to the user for entering descriptive helpful text concerning the formula or meter.

Figure 13:
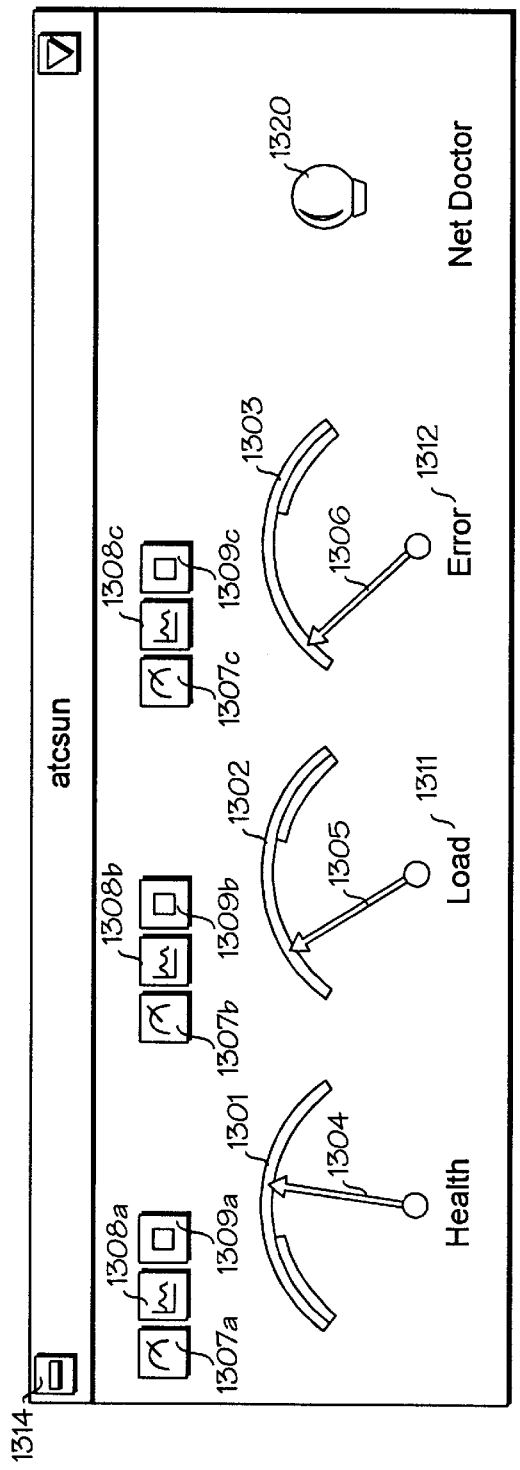
FIG. 13 illustrates a typical meter window wherein dial meters are displayed on a network management system.

FIG. 13 illustrates a typical meter window 1300 displayed on the network management system. Meter window 1300 includes health 1301, load 1302, and error 1303 dial meters. The present health, load, and error of the network are given by the positions of indicators 1304,1305, and 1306, respectively. Given a range from 0 to 10, for each of the gauges, FIG. 13 shows that the approximate present health of the network is 6; network load is 3; and network error is 2.

In the currently preferred embodiment of the present invention, there are three icons 1307–1309 associated with each of the three dial meters 1301–1303. Icons 1307a–c have imprints of a dial. Icons 1307a–c have imprints of a graph. Icons 1309a–c have imprints of a rectangle. An operator or end-user can select between these three icons by using a mouse to position a cursor over the desired icon and clicking a button on the mouse. Alternatively, the user can use a keyboard to select an icon. If a dial icon 1307a–c is selected, meter window 1300 will display a corresponding dial meter. In other words, the selection of icons 1307a–c will respectively cause the health, load, and error dial meters to be displayed, as shown in FIG. 13. Meter window 1300 further displays the names 1310–1312 of each dial meter 1301–1303 under each of the respective meters. In addition, the particular network or device being monitored is displayed 1313. An icon 1314 is provided to close meter window 1300.

However, selection of icons 1307*a–c* will respectively cause a graph meter of the health, load, and error, to be displayed in place of the dial meters.

As discussed above, the graph meters plot the generic objects such as health, load, and error as a function of time.

Figure 14:
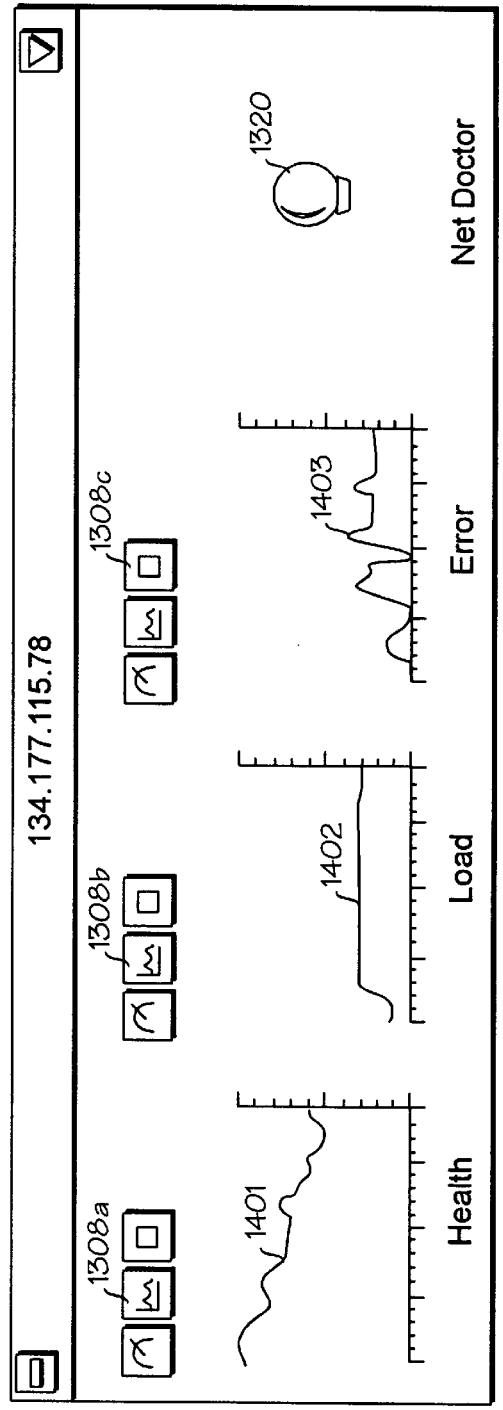
FIG. 14 illustrates a typical meter window wherein graph meters are displayed on a network management system.

FIG. 14 illustrates the situation wherein icons 1307*a–c* have been selected. Instead, the graph meters are displayed in substitution. Graphs of the network's health 1401, load 1402, and error 1403 are displayed as a function of time. In FIG. 14, the health, load and error have a range of 0 to 10.

FIG. 15 illustrates the situation wherein the operator or end-user selects icons 1309*a–c*. Selection of icons 1309*a–c* causes digital meters 1401–1403 to be displayed in substitution of either dials or graphs. The selected icon is highlighted.

FIG. 16 illustrates the situation wherein icons 1307*a*, 1308*b*, and 1309*c* have been selected by an operator. Icons 1307*a*, 1308*b*, and 1309*c* are highlighted. The selection of icon 1307*a* causes health dial meter 1301 to be displayed. Icon 1308*b* causes the load graph meter 1302 to be displayed. Icon 1309*c* causes the error digital meter 1403 to be displayed. Hence, the nine icons (1307*a–c*, 1308*a–c*, and 1309*a–c*) toggles between the three different meter types (dial, graph, and digital) for displaying the health, load, and error of the network/device being monitored.

The operator can access more detailed information regarding the network/device's health, load and error by using a mouse to place a cursor over a health, load, or error gauge or graph and then double clicking a button. Depending on which one of the objects (i.e., health, load, or error) was selected, a window containing more detailed data will be displayed underneath that object.

Figure 17:
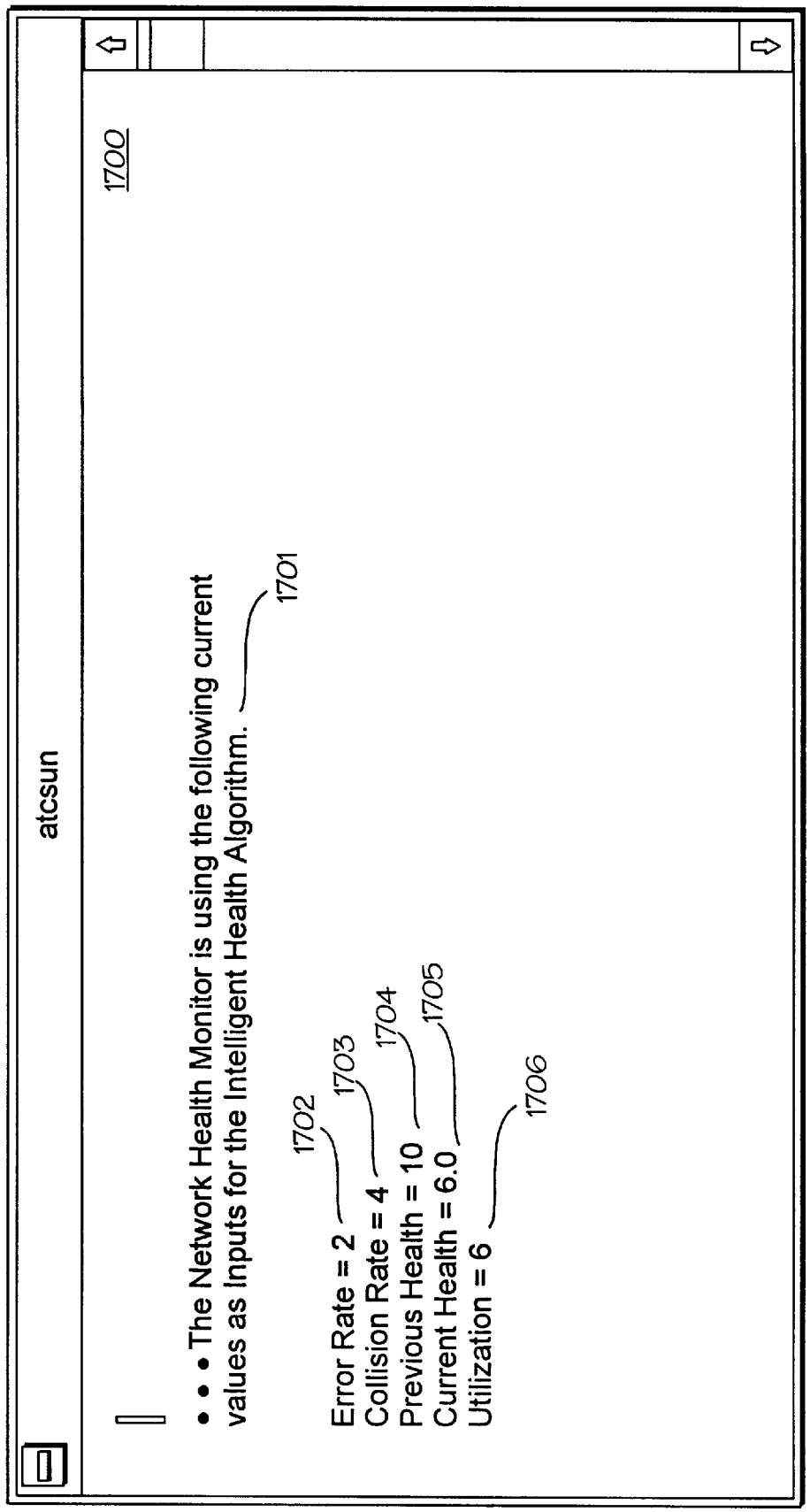
FIG. 17 illustrates a typical meter window wherein by clicking on a meter, a data window containing more detailed information pertaining to that particular meter is displayed.

For example, if the operator clicks on a health meter, a health data window 1700, as illustrated in FIG. 17, is opened under the meter window 1300. More detailed data regarding the health of the network/device is displayed in window 1700. Health data window 1700 includes an explanatory sentence, "The Network Health Monitor is using the following current values as inputs for the Intelligent Health Algorithm" 1701, the error rate 1702, the collision rate 1703, the previous health 1704, the current health 1705, and the utilization 1706.

Figure 18:
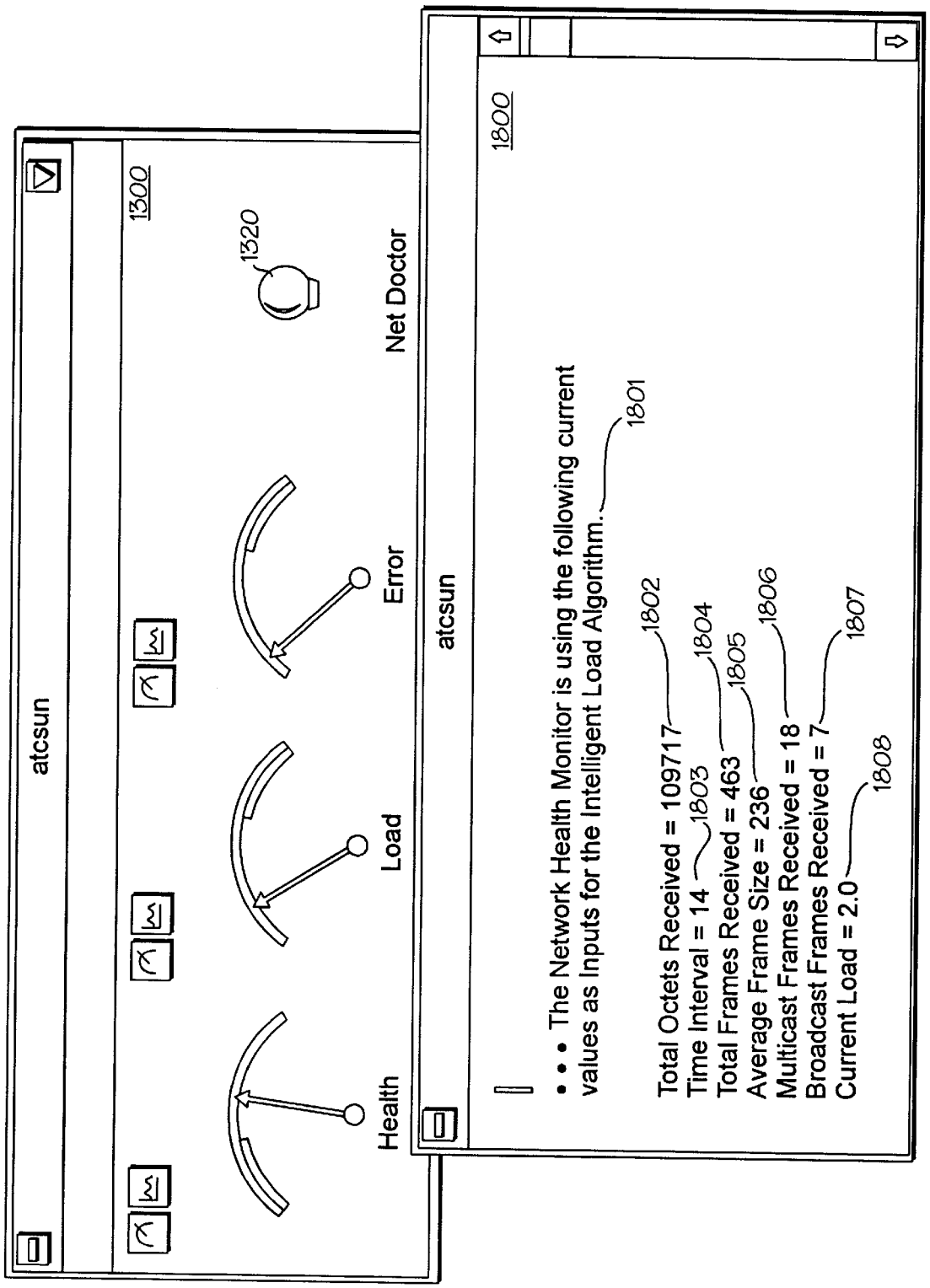
FIG. 18 illustrates a load data window.
Figure 19:
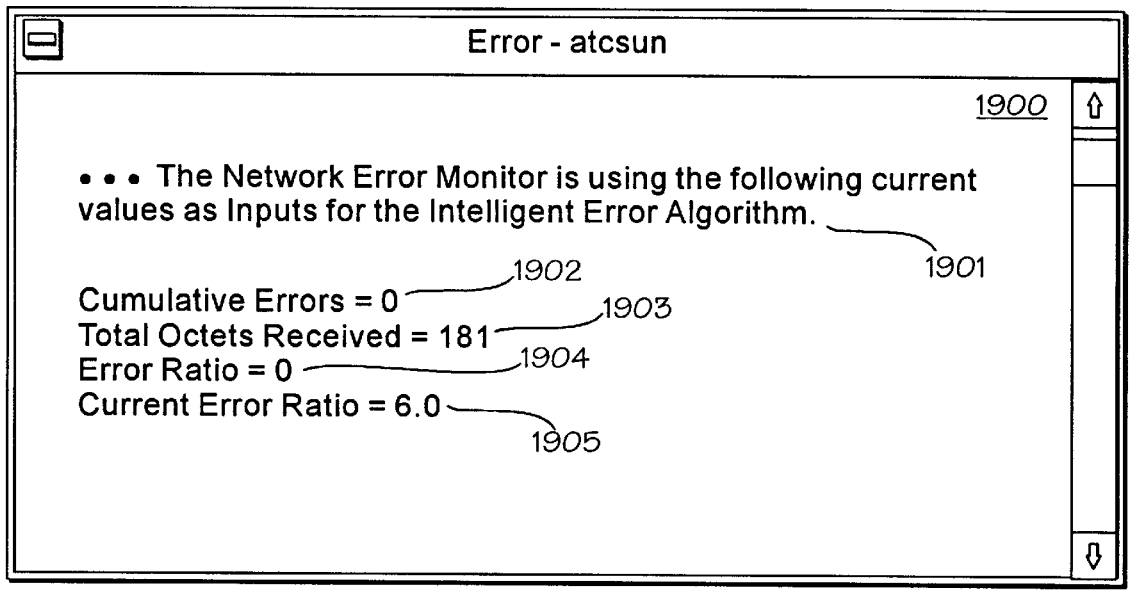
FIG. 19 illustrates an error data window.

FIG. 18 illustrates the situation wherein the operator clicked the cursor on the load meter to request more information regarding the load on the network/device. Load data window 1800 is opened under meter window 1300 and displays load data on the network/device being monitored. Displayed load data includes: an explanatory sentence 1801 such as, "The Network Load Monitor is using the following current values as inputs for the Intelligent Load Algorithm," the total octets received 1803, the time interval 1803, the total frames received 1804, the average frame size 1805, the multicast frames received 1806, the broadcast frames received 1807, and the current load 1808. If the operator clicks on an error meter, an error data window 1900 is opened under meter window 1300. FIG. 19 illustrates an example of an error data window 1900. Error data displayed by window 1900 includes an explanatory sentence such as, "The Network Error Monitor is using the following current values as inputs for the Intelligent Error Algorithm" 1901, the cumulative errors 1902, the total octets received 1903, the error ratio 1904, and the current error value 1905.

Figure 20:
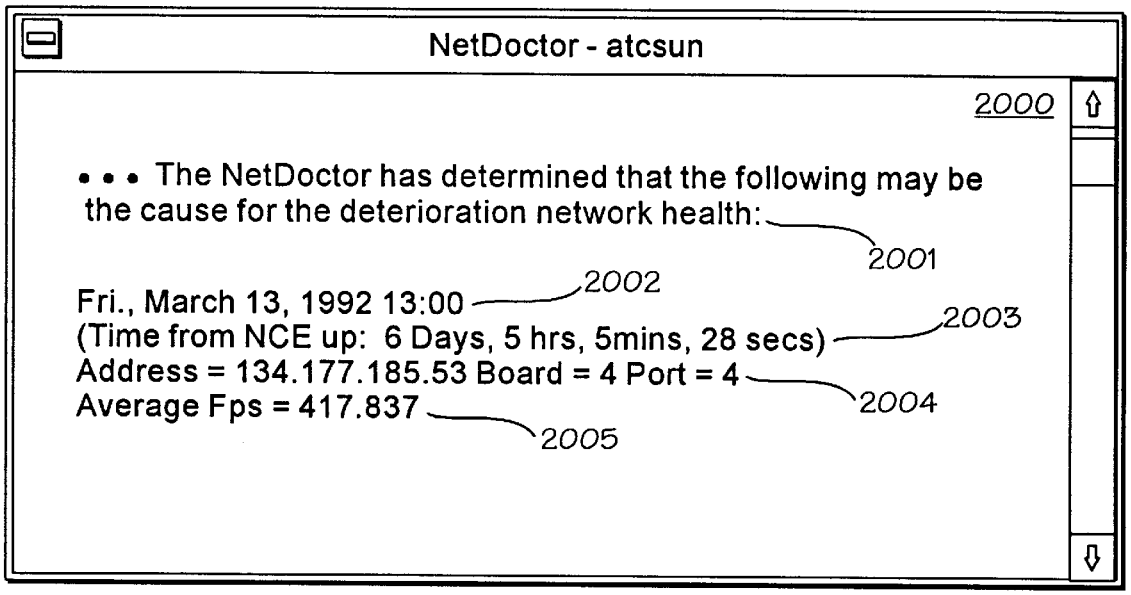
FIG. 20 is a window illustrating the function of the NetDoctor.

Referring back to FIGS. 13–17, an icon 1320 in the shape of a light bulb and labeled as "NetDoctor" is also displayed in the meter window 1330. When icon 1320 is selected by an operator using the keyboard or pointing and clicking a cursor on the light bulb, a NetDoctor window 2000, as shown in FIG. 20, will be displayed. NetDoctor window 2000 includes an explanatory sentence such as, "NetDoctor has determined that the following may be the cause for the deterioration of the network health" 2001, the current time 2002, time from last upgrade 2003, the average frames per second 2005, and possible problem areas which might cause deterioration in the health of the network 2005. In FIG. 20, the possible problem area 2005 is located at address 134.177.185.52, board 4, port 4.

Default Formulas

The following list describes default formulas for various device types.

| Device Type | Default Formulas |
|---|---|
| Ethernmet Port and Slot | Error = ((Øtoo long errors + Ørunt errors + Øalignment errors + Øfcs errors)/(Øframes received ok))*100<br>Utilization = (((Øoctets received ok)/Øtime)/1,2500,000)*100 |
| Ethernet Concentrator and Segment | Error = ((Øtoo long errors + Ørunt errors + Øalignment errors + Øfcs errors/(Øframes received ok))*100<br>Collision = ((Øfragment errors)/Øframes received ok))*100<br>Utilization = (((Øoctets received ok)/Øtime)/1,250,000)*100 |
| Token Right Port and Slot | Isolating Error = (Øline error + Øburst errors + Øari/fci errors + Øinternal errors)Øtime<br>Non-Isolating Error = (Ølost frames + Øreceive congest errors + Øframe copy errors + Øtoken errors + Øabort transmitter errors + Øfrequency errors)/Øtime |
| Token Ring | Isolating Error = ((Øline errors + Øburst errors + Øari/fci errors + Øinternal errors)/(Øframes received ok))*100<br>Non-Isolating Error = ((Ølost frames + Øreceive congest errors + Øframe copy errors + Øtoken errors + Øabort transmitter errors + Øfrequency errors)/(Øframes received ok))*100<br>Utilization = (((Øoctets received ok)/Øtime)/500,000)*100 for 4 megabits<br>Utilization = (((Øoctets received ok)/Øtime)/2,000,000)*100 for 17 megabits |
| Ethernet Bridge | Error = maximum error rate of either port A or part B<br>Collision = maximum collision rate of either port A or port B<br>Utilization = maximum utilization rate of either port A or port B<br>Forwarding Valve for port A = ({2} Øframes transmitted ok/{1} Øframes received ok)*100.<br>Forwarding Valve for port B = ({1} Øframes transmitted ok/{2} Øframes received ok)*100<br>Filtering Valve for Port A = ({1} Øframes received ok - {2} Øframes transmitted ok)/{1} (Øframes received ok)*100<br>Filtering Valve for Port B = ({2} Øframes received ok - {1} Øframes transmitted ok)/{2} (Øframes received ok)*C |

-continued

| Device Type | Default Formulas |
|---|---|
| Router | Error = maximum of the error meters of (Interface Ethernet 0, Interface Ethernet 1, DECNET, Appletalk, Novell, and IP) where the error meters for the: Interface Ethernet 0 = {0} (Øinput runt error packets + Øinput giant error packets + Øinput CFC error packets + Øinput misaligned error packets + Øinput overrun error packets)/(Øtime) Interface Ethernet 1 = {1} (Øinput runt error packets + Øinput giant error packets + Øinput CFC error packets + Øinput misaligned error packets + Øinput overrun error packets)/(Øtime) DECNET = (ØDECNET format errors + ØDECNET no route errors + ØDECNET too many hops errors)/ (Øtime) XNS = (ØXNS format errors + ØXNS checksum errors + ØXNS too many hops errors + ØXNS unknown packet errors)/(Øtime) AppleTalk = (ØAppleTalk format errors + ØAppleTalk checksum errors + ØAppleTalk too many hops errors + ØAppleTalk unknown packet errors)/(Øtime) Novell = (ØNovell format errors + ØNovell checksum errors + ØNovell too many hops errors + ØNovell unknown packet errors(/(Øtime) IP = (ØIP header errors + ØIP address errors + ØIP discard errors + ØIP reassembly fails + ØIP fragment fails)/(Øtime) Utilization = (ØDECNET packets forwarded + ØXNS packets forwarded + ØAppleTalk packets forwarded + ØNovell packets forwarded + AIP packets forwarded)/(Øtime) where the utilization for the: ØDECNET = (ØDECNET packets forwarded)/(Øtime) ØXNS = (ØXNS packets forwarded)(Øtime) ØAppleTalk = (ØAppleTalk packets forwarded)/(Øtime) ØNovell = (ØNovell packets forwarded)(Øtime) ØIP = (ØIP packets forwarded)/(Øtime) |
| Terminal Server | Error (Ports 1–16) = (Øframing errors + Øparity errors + Øoverrun errors)/(Øinput characters) |
| FDDI MAC | Error Ratio = ØsnmpFddiMACLostCt + ØsnmpFddiMACErrorCT)/ ØsnmpFddiMACFrameCt + ØsnmpFddiMACLostCt)) × 2**16 Performance = ØsnmpFDDIMACFrameCt/ØTime Link Error = ØsnmpFDDIPORTLemCts/ØTime |

What is claimed is:

1. In a computer network system, an apparatus for providing a user with an indication of an overall degree of functionality of said computer network system, said apparatus comprising:

a circuit for gathering diagnostic and status information from various units of said computer network;

a memory coupled to said circuit for storing software which instructs said circuit on which of said diagnostic and status information is to be gathered;

a network management station coupled to said computer network for evaluating said gathered diagnostic and status information, said gathered diagnostic and status data representing a plurality of different parameters, the network management station further for generating a unitless value as a function of said plurality of different parameters, such that said unitless value represents said overall degree of functionality of said computer network; and a display screen for displaying said unitless value, wherein said unitless value ranges from an indication that said computer network is functioning properly to an indication that said computer network is not functioning properly.

2. The apparatus according to claim 1, wherein said network management station further comprises storage means for storing past diagnostic and status information in determining said unitless value.

3. The apparatus according to claim 1, wherein said unitless value is conveyed by a meter display of said network management station.

4. The apparatus according to claim 3, wherein said meter is one of a dial meter, a graph meter, or a digital meter.

5. The apparatus according to claim 4 further comprises:

a selector which said user can select between one of said dial meter, graph meter, and digital meter.

6. The apparatus according to claim 1, wherein said diagnostic information includes utilization, collision, and error values of said computer network.

7. The apparatus according to claim 1, wherein said status information includes status on data terminal equipment, concentrators, repeaters, bridges, routers, and file servers.

8. The apparatus according to claim 1, wherein said network management station further comprises a display of a load of said computer network.

9. The apparatus according to claim 1, wherein said network management station further comprises a display of said diagnostic information.

10. The apparatus according to claim 1, wherein said network management station further comprises logic for allowing a user to specify a method for generating said unitless value, said logic utilizing a default generation method if said user does not specify a particular method.

11. The apparatus according to claim 1, wherein said software is distributable.

12. In a computer network system, a computer implemented method for indicating an overall degree of functionality of said computer network, said method comprising the steps of:

determining a plurality of parameters relating to said computer network;

assigning to each of said parameters a weight representing a degree of importance relative to the others of said parameters to generate a plurality of weighted parameters;

correlating said plurality of weighted parameters to a range of conditions representing different degrees of functionality of said computer network, wherein said correlating step results in a single unitless value representing said overall degree of functionality of said computer network; and displaying an image that conveys said unitless value to said user.

13. The method according to claim 12 further comprising the steps of:

storing historical computer network specific parameters;

adjusting said unitless value according to said historical computer network specific parameters;

storing current network specific parameters of said computer network;

adjusting said historical network specific parameters based on said current network specific parameters so that said adjusted historical network parameters are used to adjust a future unitless value.

14. The method according to claim 12, wherein said parameters include utilization, collision, and error values.

15. The method according to claim 14, wherein said parameters further includes the status of at least one device on said computer network, the method further comprising the step of reducing said unitless value by a factor for each inoperable device on said computer network, said device comprising any of data terminal equipment, concentrators, repeaters, bridges, routers, and file servers.

16. The method according to claim 12, wherein said unitless value is conveyed by a meter display.

17. The method according to claim 16, wherein said meter display comprises a dial meter, a graph meter, or a digital meter.

18. The method according to claim 17 further comprising the steps of:

selecting a first icon associated with one of said dial meter, graph meter, and digital meter;

displaying said meter display corresponding to said first selected icon;

selecting a second icon associated with one of said dial meter, graph meter, and digital meter;

displaying said meter display corresponding to said second selected icon, wherein selecting said first icon and selecting said second icon toggles between displaying said meter display corresponding to said first icon and said meter display corresponding to said second icon.

19. The method according to claim 12, wherein an alarm condition is displayed if said unitless value falls below a predetermined threshold, said alarm condition indicating said computer network requires attention.

20. The method according to claim 12 further comprising the step of displaying a load on said computer network.

21. The method according to claim 12, wherein said unitless value has a range, wherein said range is 0 to 10 or 0 to 100.

22. The method according to claim 12 further comprising the step of selecting a particular computer value for said parameter to be displayed.

23. The method according to claim 22 further comprising the step of causing said computer network to display probable problems which might cause a deterioration in said overall degree of functionality of said computer network.

24. The method according to claim 12, further comprising the steps of enabling said user to specify how said parameters are to be correlated to said unitless value, and selecting a default correlation formula when said user does not specify how said correlation is to be accomplished.

25. In a computer network, a method of conveying an overall health of said computer network, said method comprising the steps of:

determining status information pertaining to various operating parameters of said computer network, the status information including a plurality of subsets, each subset corresponding to one of said operating parameters;

weighting each of said subsets of said status information according to an estimated degree of impact of each of said operating parameters on said overall health of said computer network relative to each of the others of said operating parameters;

generating a single weighted value that conveys said overall health of said computer network based on said weighting step;

displaying said weighted value as a graphical display ranging from a peak performance to a degraded performance of said computer network.

\* \* \* \* \*